(No Model.)

W. C. EVANTS.
TWO WHEELED VEHICLE.

No. 268,087. Patented Nov. 28, 1882.

Witnesses.
Richard Martin Jr.
G. L. Gammans

Inventor.
William C. Evants
By his attorney,
D. P. Kennedy

UNITED STATES PATENT OFFICE.

WILLIAM C. EVANTS, OF PORTLAND, OREGON.

TWO-WHEELED VEHICLE.

SPECIFICATION forming part of Letters Patent No. 268,087, dated November 28, 1882.

Application filed April 7, 1882. (No model.)

*To all whom it may concern:*

Be it known that I, WILLIAM C. EVANTS, a resident of the city of Portland, in the county of Multnomah, State of Oregon, have invented certain new and useful Improvements in Driving or Road Carts, of which the following is a specification.

My invention relates to that class of vehicles known as "two-wheeled driving or road carts."

Heretofore vehicles of this class have been constructed with the brace or spring attached to rear of seat or shafts, and to the shafts in front of axle in such manner that the jarring action of the axle will not affect the occupant; but the unpleasant, fatiguing motion to which the rider is subjected by the constant rocking motion of the seat, produced by the up-and-down motion of the shafts from the movements of the horse, has not been overcome, and to attain this result is the object of my invention; and my improvements consist in suspending the body of the cart between the shafts and over the springs by suitable means, so that the body will remain in a comparative state of equilibrium irrespective of the motion of shafts, spring, or axle.

Figure 1:
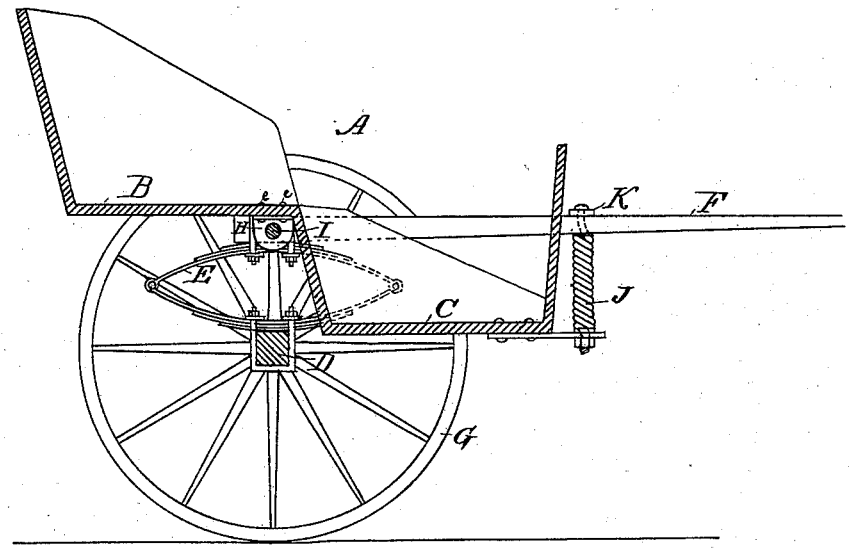
Figure 2:
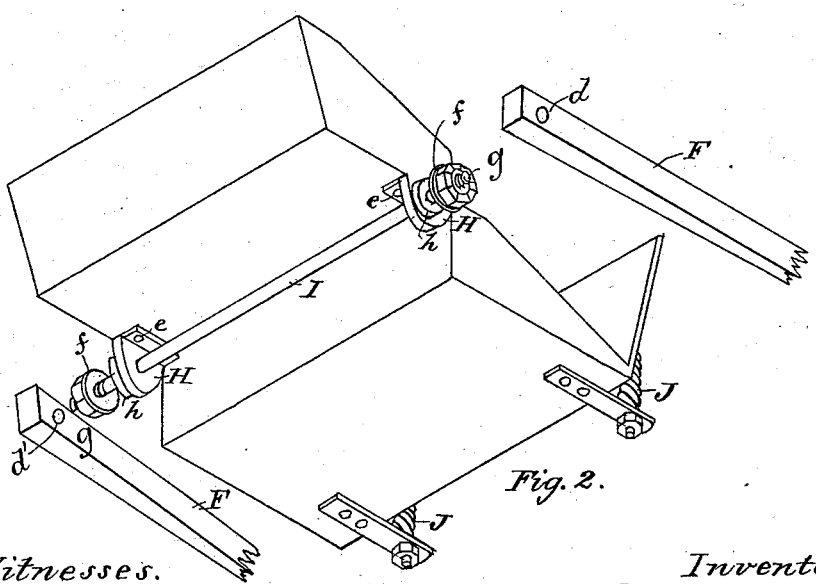

In the accompanying drawings, forming part of this specification, Figure 1 is a view in longitudinal section of my invention. Fig. 2 is a bottom perspective view of the cart-body, showing my improvements in detail.

A represents the body of cart, and is constructed with a seat, B, and a bottom or foot board, C, the back or foot board C being constructed in an angle sufficient to avoid the axle D.

E E are the main springs.

F F are the shafts.

G G are the wheels of cart.

Attached on the under side of seat B of body are two hollow iron boxes, H H, one on each end, as shown in Fig. 2. These boxes H H are fastened securely by threaded bolts and nuts $e\ e$ to the seat B. The shafts F F are perforated, as shown at $d\ d'$, and through these perforations $d\ d'$ and boxes H H a rod, I, is placed, having on each end, outside of the shafts F F, a washer, $f$, and nut $g$, and a rubber washer, $h$, between the body and inside of shafts. This rod I fits snugly in the boxes H H, and the cart-body oscillates by means of the boxes H H in a vertical plane thereon.

J J are two coiled springs, which are attached to each front corner of the cart-body and to the front cross-bar, K, of shafts F F.

It will be seen from the location of the body in relation to the shafts and axle of cart that the body will not come in contact with any other part of the cart, except the oscillating-point of boxes H H, rod I, and springs J J, being maintained in a comparative state of equilibrium and not affected by the movements of the horse, shafts, springs E E, or axle.

Having described my invention, what I claim as new, and desire to secure by Letters Patent, is—

1. The boxes H H, attached to the under side of seat B, in combination with the rod I, washers $f\ h$, nuts $g\ g$, and shafts F F, as shown, and for the purpose set forth.

2. The freely-suspended coiled springs J J, attached to the body A and cross-bar K, and pliant or yielding in every direction, substantially as and for the purpose set forth.

3. In combination, body A B C, boxes H H, springs J J, rod I, washers $f\ h$, nuts $g\ g$, and shafts F F, substantially as herein shown and described.

WILLIAM C. EVANTS.

In presence of—
VERNA M. EVANTS,
D. P. KENNEDY.